UNITED STATES PATENT OFFICE.

LUDWIG ROSELIUS, OF BREMEN, GERMANY.

PREPARATION OF COFFEE.

1,000,692.  Specification of Letters Patent.  Patented Aug. 15, 1911.

No Drawing.    Application filed March 19, 1909.  Serial No. 484,365.

*To all whom it may concern:*

Be it known that I, LUDWIG ROSELIUS, a citizen of the free and hanseatic city of Bremen, Germany, residing at Bremen, Germany, have invented certain new and useful Improvements in the Preparation of Coffee, of which the following is a specification.

This invention relates to a preparation of coffee, whether ground or unground, and further relates to the product derived from the manner of treating the coffee, and has for its object, to remove from roasted coffee caffein, without destroying the aromatic or other valuable properties of the coffee.

Numerous attempts have been made for the purpose of removing caffein from roasted coffee, but such attempts have been unsuccessful owing to the fact that after a treatment of the coffee, the caffein has not only been removed, but the aromatic, as well as the other valuable constituents of the coffee destroyed, consequently the coffee after the treatment could not be used as a satisfactory beverage.

Therefore, it is the object of this invention to provide a method of treating roasted coffee, which removes the caffein without destroying or injuring the other valuable properties whereby the coffee after treatment can be used as a satisfactory beverage.

To define specifically a method of treating coffee in accordance with this invention, reference will be had to the following:—Green coffee containing caffein is roasted, after the coffee has been roasted and the caffein still remaining in the coffee, the roasted coffee is preferably moistened by subjecting the coffee to air containing a degree of moisture not sufficient to cause waterpearls to be precipitated directly on the superficies of the beans, which might deteriorate the structure or quality of the bean. The coffee beans are dryer than the air surrounding them, the air, which is more moist than the beans, is only made to pass the beans, causing the beans to gradually absorb the desired degree of moisture. The period for the indirect moistening of the coffee is preferably twenty-four hours. By indirectly moistening the coffee it will absorb the necessary amount of moisture so as to loosen the structure thereof, or the cellular tissue, so as to prepare for the decomposition of the caffein salts, as the caffein is contained in the coffee in the shape of salts which are hardly soluble at all in volatile solvents alone. After the coffee has been moistened for the desired period, it is heated to a temperature of from about 70° to 90° C. This manner of heating the coffee to such an extent causes the coffee to remain in a moistened state. In this connection it will be stated that it is possible to heat water to a temperature of from 70 to 90 degrees without evaporating it and if the moisture is in the coffee beans, it is still easier to inhibit the evaporation at such a low temperature and under such conditions the beans are not thoroughly dried after being submitted to the temperature referred to for the reason that the beans still contain a degree of moisture. It is then subjected to electrolysis, and in this connection it will be stated that the coffee is placed into an open wooden trough, on the insides of its two walls two copper plates are fixed, one constituting a positive and the other the negative, suitable circuit wires are connected to the plates. The subjecting of the coffee to electrolysis causes the decomposition of the salts of caffein. During the electrolyzing step a suitable medium to heighten the effect of the current is added, such medium by way of example being sodium chlorid. In this connection it will be stated that the coffee prior to placing it into the trough, is placed in a wooden drum together with the sodium chlorid and is agitated sufficiently to have the solution evenly distributed on the superficies of the bean, after which the coffee is placed in the wooden trough and treated by the electric current as described.

After the salts of caffein have been decomposed the caffein is extracted in a known manner, that is to say, the coffee is subjected to a dissolvent of caffein, preferably one which dissolves only the caffein and as little as possible of the other aromatic constituents of the coffee, for example, as that set forth in Letters Patent #897,840, the solvent being benzin, or a mixture of benzin and alcohol.

After the caffein has ben extracted by the solvent the coffee is then placed in a roasting apparatus and dry steam is passed through the coffee which removes all traces of the solvent. After all the traces of the solvent have been removed, the coffee is then thoroughly dried, or brought to a state of dryness whereby it is ready for use.

By moistening the roasted coffee in the manner as stated, the aromatic properties of the coffee are not injured or impaired, such would be the case however if the coffee had directly precipitated thereon the water, or if the coffee is soaked.

By the method heretofore set forth, roasted coffee can be freed of caffein without impairing to any material extent the aromatic or other valuable constituents thereof.

What I claim is:

A method of treating roasted coffee for the removal of caffein which consists in moistening the roasted coffee, then partially drying the moistened beans, then subjecting the beans to a solution to facilitate an electrolytic step, then decomposing the salts of caffein in the beans by electrolysis, then extracting the caffein by a solvent which does not impair the other valuable constituents of the coffee, then subjecting the coffee to dry steam to remove the traces of the extracting solvents, and then bringing the coffee to a state of dryness by heat whereby the coffee is ready for use.

In testimony whereof I affix my signature, in presence of two witnesses.

LUDWIG ROSELIUS.

Witnesses:
N. LOUIS BOGAN,
SYLVANUS D. WARD.